March 5, 1968
P. KLINGER
3,372,386
APPARATUS FOR THE DETERMINATION OF THE HORIZONTAL ACCELERATION
COMPOSED OF DIFFERENT COMPONENTS IN AUTOMOTIVE VEHICLES
Filed Feb. 15, 1965
2 Sheets-Sheet 1
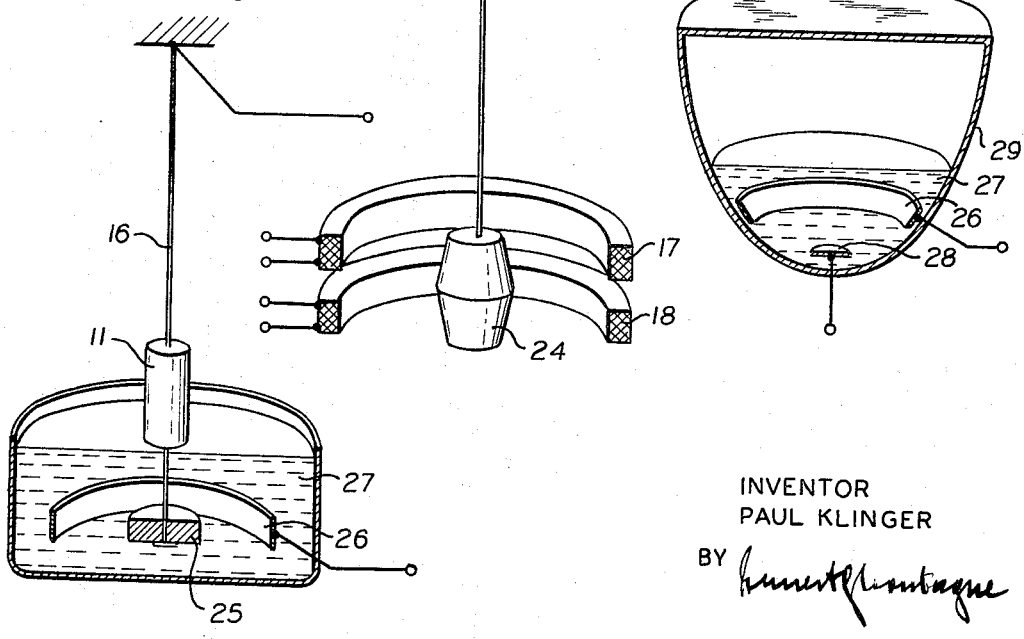
INVENTOR
PAUL KLINGER
BY
ATTORNEY.

March 5, 1968  P. KLINGER  3,372,386
APPARATUS FOR THE DETERMINATION OF THE HORIZONTAL ACCELERATION
COMPOSED OF DIFFERENT COMPONENTS IN AUTOMOTIVE VEHICLES
Filed Feb. 15, 1965  2 Sheets-Sheet 2
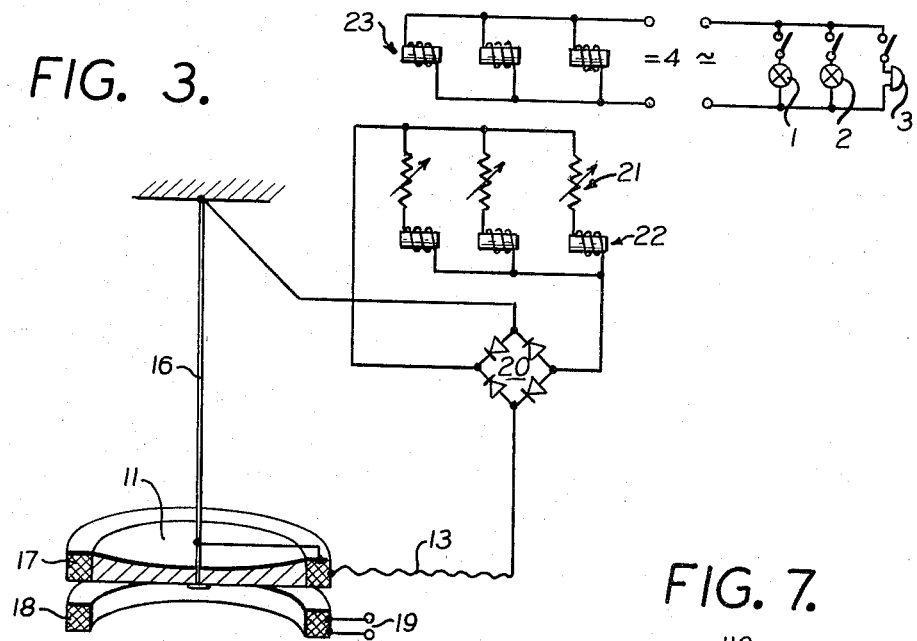
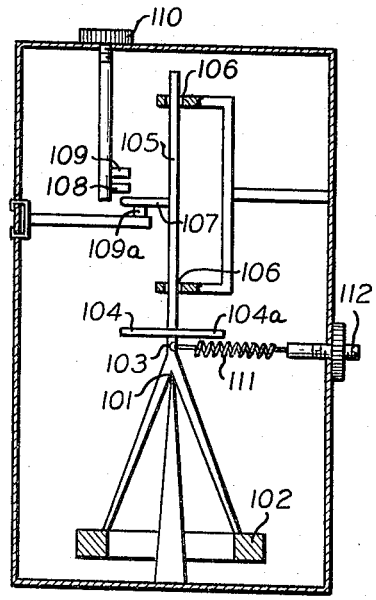
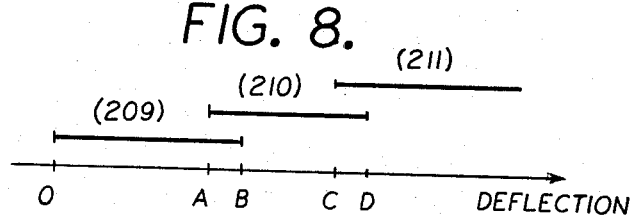
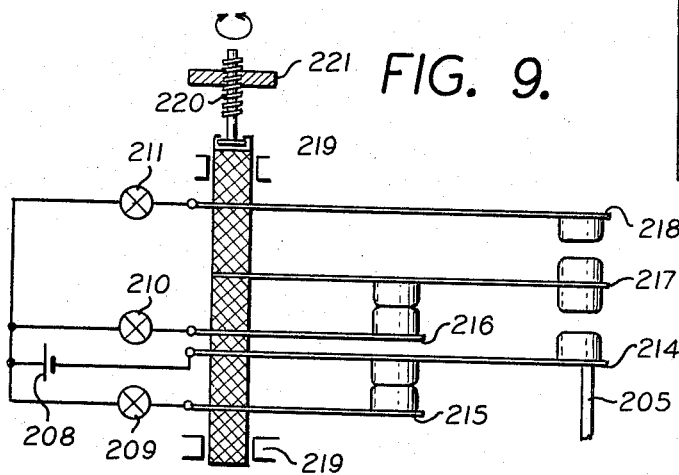
INVENTOR
PAUL KLINGER
BY
ATTORNEY.

United States Patent Office 3,372,386
Patented Mar. 5, 1968

3,372,386
APPARATUS FOR THE DETERMINATION OF THE HORIZONTAL ACCELERATION COMPOSED OF DIFFERENT COMPONENTS IN AUTOMOTIVE VEHICLES
Paul Klinger, Vienna, Austria, assignor to Kuratorium für Verkehrssicherheit, Vienna, Austria, a corporation of Austria
Filed Feb. 15, 1965, Ser. No. 432,540
Claims priority, application Austria, Mar. 13, 1964, A 2,194/64; May 4, 1964, A 3,915/64
4 Claims. (Cl. 340—262)

ABSTRACT OF THE DISCLOSURE

An apparatus for the determination of the amount of the horizontal acceleration composed of at least one component in automotive vehicles, comprising a housing secured to a vehicle, a pendulum mounted swingably in the housing and including a mass substantially horizontally movably disposed in the housing in at least two degrees of freedom, a disc associated with the pendulum, an electric contact device having a plurality of contacts, an indicating device connected with each of the plurality of contacts, a linkage means abutting a surface of the disc and being moved by the swinging of the pendulum by acceleration and for operating the electric contact device upon movement of the pendulum mass, wherein each of the plurality of contacts are successively operated with additional swinging of the pendulum, and two of the indicating devices are operated simultaneously in a transfer range of operation of one of the indicating devices to the next adjacent range of operation of another of the indicating devices.

---

The present invention relates to an apparatus for the determination of the horizontal acceleration composed of different components in automotive vehicles, in general, and to such an apparatus in which the swinging of a mass relative to a housing surrounding the same, which is connected with the vehicle, serves as a measure for the acceleration. The mass is returned by gravity and/or by the force of into its rest position.

It is the aim and purpose of the apparatus to improve the driving skill of many drivers of automotive vehicles such that road conditions are simulated for driving pupils, in which class also belong owners of driver's licenses, particularly during the first period of their driving activities. It is possible by means of the apparatus to simulate on normal, dry and good gripping roads, road conditions occurring, for example, due to rain, snow, ice, etc., where the gripping between the tires of the vehicle and the road is appreciably reduced, by surpassing the critical values, which in a serious case would cause the vehicle to skid and, thereby, with almost certain probability would lead to an accident, and without risk of any danger to the students and teachers, respectively, and without involving high cost for the preparation of the road with corresponding gripping values, as well as without the otherwise necessary simultaneous safety closing measures for the surroundings of the road way.

It is, therefore, one object of the present invention to provide an apparatus for the determination of the horizontal acceleration composed of different components in automotive vehicles, wherein a mass is disposed which is practically horizontally movable in two degrees of freedom and which is equipped with a contact device for the operation of electrical signal devices, and in acceleration measuring devices, the mass of which is movable with only one degree of freedom, and by connecting electrical signal apparatus with the contact device. The signal apparatus are formed, thereby, as electro-optical and/or electro-acoustical indicating devices. The electro-optical indicating devices are preferably disposed within the field of peripheral view for the driver upon observation of the road by the driver, and if desired, can be designed in different colors.

With this and other objects in view, which will become apparent in the following detailed description, the present invention will be clearly understood in connection with the accompanying drawings, in which:

FIGURE 1 is a schematic perspective view of the apparatus designed in accordance with the present invention, in which the mass is designed as a bob of a pendulum suspended on an universal joint and the contact device comprises contact rings and sliding contacts;

FIG. 1a is a pendulum suspension with a point and a seating;

FIG. 2 shows schematically one part of the apparatus designed in accordance with the present invention, in which the mass is designed as the bob of a pendulum with a clamped elastic pendulum rod;

FIG. 3 is a perspective view, partly in section, of the apparatus designed in accordance with the present invention, in which the mass is designed as a bob of a pendulum and the contact device has two coupling coils, one of which is connected with the bob;

FIG. 4 is a perspective view, partly in section, of a device designed in accordance with the present invention, in which the contact device comprises two immovably disposed coupling coils, the relative coupling of which is achieved by the movable mass;

FIG. 5 is a part of an apparatus designed in accordance with the present invention, in which the contact device comprises two electrodes disposed in a conducting liquid;

FIG. 6 is a perspective view of a part of an apparatus designed in accordance with the present invention, in which the mass is formed by an electrically conducting liquid and the contact device includes electrodes disposed in the liquid;

FIG. 7 is a schematic elevation of an apparatus designed in accordance with the present invention, the mass of which is designed as a pendulum bob, whereby a guide face is connected with the pendulum, which guide face operates the contacts by means of a linkage;

FIG. 8 is a diagram which depicts in a suitable structure of the apparatus, designed in accordance with the present invention with a plurality of indicating devices, the function ranges thereof overlapping each other suitably; and FIG. 9 shows schematically a contact device with the indicating members for an apparatus designed in accordance with the present invention.

Referring now to the drawings, and in particular to FIG. 1, disclosing one embodiment of the present invention, the essential elements of the apparatus are clearly illustrated. Electro-optical and electro-acoustical indicating devices 1, 2 and 3, for which the operating current is fed from an electric source 4, are provided. Upon arriving at predetermined acceleration values, these electro-optical and electro-acoustical indicating devices 1, 2 and 3 will respond and be rendered operative. For this reason it is necessary to close the circuit of the indicating devices 1, 2 and 3 by means of a suitable contact device.

The contact device disclosed in FIG. 1 comprises a sliding contact 5 and a plurality of concentrically disposed contact rings 6, 7 and 8. A small spring 9 urges the sliding contact 5, if the latter is in a corresponding position, towards the contact rings 6, 7 and 8 causing a proper contact engagement. The sliding contact 5 is mounted on a pendulum rod 10, which carries a mass 11 at its lower end and by a swinging movement of the latter under the influence of forces thereon, the sliding contact 5 moves from its central rest position to the contact rings 6, 7 and 8, respectively, and beyond the latter. By the mounting of the pendulum rod 10 in an universal joint 12, a movement of the mass 11 with two degrees of freedom which is practically horizontal, is assured. Instead of the universal joint, it is also possible to provide a suspension of the pendulum rod 10 on a point 14, which rests in a bearing seat 15, as shown in FIG. 1a of the drawings. In order to avoid the transfer of relatively great currents through the bearing elements, a flexible current feed 13 is provided for feeding contact 5.

The swinging of the mass 11 is influenced by a great variety of factors. In addition to the acceleration in the direction of travel caused by the mode of operation of the driving activity and the centrifugal accelerations occurring during traveling in curves, there are inclinations of the vehicle caused by the surface of the road, by the load distribution in the vehicle and by the dynamic travel conditions of the vehicle can be observed. These influences can be accepted by a corresponding formation of the contact rings 6, 7 and 8. The same goal can also be obtained by returning the pendulum to its rest position solely by the force of a spring or by an additional force of a spring. The spring force effective in the horizontal plane can be chosen differently in various directions, or can be adjusted in accordance with requirements thereof.

In practically designed apparatus in accordance with the present invention, contact rings 6, 7 and 8 of elliptical shape have been found suitable for most of the vehicles and tires in use at the present time, whereby the longitudinal axis of the contact rings coincides with the direction of movement of the vehicle. In ring-shaped or equal operating contact devices, an additional spring force is capable of obtaining the same effect, which spring force becomes effective during the swinging of the pendulum in the direction of the movement of the vehicle.

In order to assure a universal application of the apparatus, it is of advantage not only to provide, as shown for purpose of simplification in the drawings, a low number of contact rings and to connect each ring with an indication device, but to provide a greater number of contact rings, in which the indicating devices can be selectively connected.

In order to assure the proper functioning of the apparatus designed in accordance with the present invention, it is necessary to dampen the movement of the mass. This can be achieved in a simple manner such that the housing surrounding the mass is filled up at least partly with an oil of suitable viscosity. If necessary, it is also possible to provide additional damping wings (not shown) on the pendulum.

By mounting the pendulum rod 10 in an universal joint (FIG. 1) and its suspension on a bearing point (FIG. 1a), respectively, and by an arrangement of the contact rings and of the sliding contact, respectively, above the bearing, the pendulum can be dampened in a simple manner by partly filling the housing with oil, whereby simultaneously the contact pressure of the sliding contact can be maintained low, since the contact rings are disposed outside of the oil.

Referring now again to the drawings, and in particular to the embodiment disclosed in FIG. 2, an elastic pendulum rod 16 is provided, to which the mass 11 is secured. By a rigid clamping at its upper end, the rod operates as a spring and delivers an additional return force upon swinging of the mass 11. By the application of a pendulum rod 16 having a non-circular cross-section (for instance an elliptical cross-section), it is possible to obtain from equal acceleration magnitudes swinging strokes of the pendulum mass of different distances in different directions. The current feed to the contact 5 can be achieved in a simple manner by the pendulum rod 16 itself.

Instead of a direct contact operation for the indicating devices, which contact operation is achieved by the swinging of the mass, it is of course also possible to provide relays as intermediate members, in order to reduce the contact load. In addition it is also possible to eliminate completely the switching contacts on the movable mass. Embodiments of the apparatus designed in such manner are disclosed in FIGS. 3 to 6 of the drawings.

Referring now again to the drawings, and in particular to FIG. 3, an embodiment of the apparatus designed in accordance with the present invention is disclosed, which comprises two coupling coils 17 and 18. One of the coils 17 is secured to the mass 11 suspended from the pendulum rod 16. The other of the coils 18 is connected mechanically with the housing. The pendulum rod 16 and an elastic band 13 serve as a current feeding means of the coil 17. The coil 18 is connected with an alternating current 19. As an alternating current source, a transistor transformer for example is particularly suitable, due to its favorable characteristics. The tension induced in the coil 17 is dependent upon its position relative to the coil 18 and is a measure for the deviation of the mass 11. The coil 17 is connected with control elements (as magnetic coils) 22 of the relays by means of a rectifier 20 and variable resistances 21. Furthermore, additional windings 23 are provided on the magnetic coils 22, which are fed with a constant current of such direction, that the relays respond to previously set values upon reduction of the tension induced in the coil 17. The switching contacts of the relays are disposed in the circuits containing the current source 4 and the indicating devices 1, 2 and 3.

Instead of the arrangement of one of the two couplings coils 17 and 18 on the pendulum 16, it is also possible to connect both coils mechanically with the housing of the apparatus and its relative coupling can be achieved by a ferromagnetic body 24, which can simultaneously function as the mass. Such embodiment is disclosed in FIG. 4 of the drawings. By the configuration or shape of the ferromagnetic body 24, the connection between the swinging caused by acceleration and the degree of coupling can be adjusted to the prevailing requirements. The ferromagnetic body 24 can have the form of, for instance, a disc (not shown), which can penetrate also the slot disposed between the two coils.

The embodiments disclosed in FIGS. 5 and 6 utilize the resistance of a conducting liquid from the cross-section of the mass and the distance of the electrodes, respectively, for the determination of the prevailing position of the mass, which is moved under the influence of the accelerations. Since, thereby, the variation of the resistance takes place continuously and the specific resistance of the liquid is suitably chosen relatively high, an arrangement is provided for the switching of the indicating devices similar to that shown in FIG. 3. As a conducting liquid, a colloidal solution as conducting substances, for instance graphite or nickel brought into a carrier solution, are particularly suitable.

In the embodiment disclosed in FIG. 5, electrodes 25 and 26 are arranged on the pendulum 11 and 16 and on the housing, respectively. The mass 11 can also serve itself as an electrode. By proper selection of the viscosity of the conducting liquid 27, the latter can serve also the purpose of damping the pendulum.

Referring now again to the drawings, and in particular to FIG. 6, an embodiment is disclosed, in which the conducting liquid serves simultaneously as the mass, which is to be moved by the acceleration operation. The returning into the rest position is obtained by gravity. In the swinging position, which is shown in point-dotted lines, the cross-section of the conducting liquid 27, which is available for the passing of current between the electrodes 26 and 28, is smaller than in the rest position, whereby the resistance of the arrangement is increased. By suitable shaping of the vessel 29, the desired operation of the dependency of the increase in resistance from the acceleration can be achieved. The designed of the electrodes 26 and 28 and of the vessel 29, respectively, is also dependent upon the prevailing application of the vessel, whereby also here, the formation of the contact rings 6, 7 and 8, as shown in the embodiments disclosed in FIGS. 1 and 2, can be applied, and the explanation of the operation in connection with the embodiment disclosed in FIGS. 1 and 2 is also applicable.

For the operation of the contact device, a guide face can be provided suitably also on the mass or on a body connected with the mass, which guide face performs during a substantially horizontal movement of the center of gravity of the mass, a tipping movement and further a linkage can be provided, which is connected at one end with the guide face and is disposed approximately vertically, which linkage is lifted and lowered, respectively, by the tipping movement of the guide face.

Referring now again to the drawings, and in particular to FIG. 7, an embodiment is disclosed, in which a pendulum 102 is arranged suspended on a pivot point 101, for instance, and having the form of an annular pendulum and the pendulum axis has an extension 103 disposed in an upward direction.

A disc 104 is arranged on the extension 103, which is subjected to tipping movements during swinging of the pendulum. The upper face 104a of this disc, which can be planar or curved, is the guide face for a rod 105 disposed above the disc 104, which rod 105 is mounted so as to be vertically displaceable in a bearing 106. If horizontal forces operate on the pendulum mass 102, the latter will swing and, thereby, the disc 104 will be subjected to a tipping movement, whereby the rod 105 engaging the guide face 104a either by gravity or by the pressure of a spring (not shown) will be subjected to a vertical movement. It is easily possible to exploit this vertical movement in any manner for closing contacts, for instance, by means of a contact finger 107, which cooperates with complementary contacts 108 and 109. Suitably, these complementary contacts 108 and 109 of which a selective number can be provided within the swinging range of the pendulum and the lifting range of the rod 105, respectively, can be adjusted by means of an adjustment device 110 (schematically illustrated), so that a contact can be obtained upon any desired elongation of the pendulum. The face 104a, shown planar in FIG. 7, can also be curved in order to influence the contact paths and the acceleration values, in which the indication devices are supposed to respond, in which case the disc 104 can have the shape of a calotte and of a cap, respectively. The face 104a can, thereby, be a rotation face or can have a longitudinal configuration, in order to obtain a different response of the indication devices upon swinging of the mass in different directions. In order to obtain such different response of the indication devices, a spring 111 may also be provided, which provides an additional return force for the mass 102. The spring tension of such spring 111 is suitably adjustable by means of a screw bolt 112.

The relative movement of the rod 105 can be used also for the determination of the zero point and of the horizontal position of the device, respectively, by closing a contact 109a in the horizontal position of the device by means of the finger 107. The contact 109a can operate an electro-optical or, under circumstances, an electro-acoustical device for the indication of the zero position.

It has been found that for the suitable transmission of the occurrence of critical values of the gripping value between the vehicle tires and the road a plurality of optical and acoustical signals, respectively, must be used for the driver, whereby one such signal is already functioning in the rest position or upon occurrence of very small forces, a second signal indicates that the horizontally effective forces between the vehicle tires and the road have reached the range of the limit and still another signal responds as soon as the limit has been passed. Each of the signals is, thereby, within a predetermined range in operation, whereby the ranges follow each other or they overlap each other.

For this reason a plurality of indicating devices are provided which are rendered operative always within a predetermined range of the acceleration values by the contact devices, whereby in the transfer zone from one range of the acceleration values to the next adjacent range of the acceleration values, the two indicating devices coordinated to both ranges are in operative position simultaneously. A guide face is suitably provided on the mass or on a body connected with the mass of the apparatus designed in accordance with the present invention, which guide face performs in a substantially horizontal movement of the center of gravity of the mass, a tilting movement, and furthermore, a pin, thread or the like is provided, which is in engagement with one end of the guide face, which pin, thread or the like transmits an axial component of the tipping movement onto the contact device.

In accordance with the diagram disclosed in FIG. 8 of the drawings, the operation ranges of three indicating devices of an apparatus according to the present invention are shown, and which operation ranges overlap the next operation range in the prevailing transfer zones from one range of the acceleration values to the next adjacent range of the acceleration values. Swinging from the zero position of the mass of the apparatus according to the present invention, only the indication device 209 is in operation. Starting with a predetermined value A in addition a further indication device 210 starts operation. Upon reaching the value B, which is greater than the value A, the indication device 209 is rendered inoperative and upon further increase of the acceleration values in this range at first only the indication device 210 alone will be in operation, which serves the purpose of advising the driver that the acceleration values caused by this mode of driving come close to the permissible limit value C. If the limit value C and, thereby, the highest set permitted gripping value between the vehicle tires and the road surface is surpassed, the third indication device 211 starts its operation, which indicates the passing over the value C. In the next adjacent range between the values C and D both indicating devices 210 and 211 are in operation. Upon surpassing the value D, the indication device 211 is in operation for all values which are greater than D, and in particular alone.

Due to the overlapping of the operation ranges of the indication devices in the zones A-B and C-D, on the one hand, a psychologically advantageous indication is obtained for the driver, and, on the other hand, also additional information about the prevailing acceleration value of the vehicle is provided, since the simultaneous operation of two indication devices informs the driver, that at the particular moment, the effective acceleration forces are within a predetermined narrow zone. This is of advantage particularly in the zone C-D, since in this case information is obtained that the highest permissible acceleration values have been surpassed only slightly, whereas if such overlapping of the operation ranges of the indicating devices were not provided, after response of the indication device 211, only that the limit value is passed would be apparent, without having any basis therefor, whether it is a slight or an appreciable surpassing.

The contact device shown in FIG. 9 comprises a contact spring set, which includes a first contact spring 214, which is pushed upwardly upon moving of the mass by the pin 205. This spring 214 is connected with one terminal of the current source 208. A second contact spring 215 forms jointly with the spring 214 a mechanically pretensioned contact closed in the rest position of the arrangement. A third contact spring 216 forms jointly with a fourth contact spring 217 likewise a contact mechanically pretensioned and closed in the resting position of the arrangement. The fourth contact spring 217 forms jointly with a fifth contact spring 218 a contact which is open in the resting position of the arrangement.

In the rest position and as long as the acceleration forces are low, respectively, the indicating device 209 which, for instance, consists of a green lamp, is connected with the electric source, by means of the closed contact consisting of the springs 214 and 215.

If now the pin 205 urges the spring 214 in upward direction, the contact points of the spring 214 engage those of the spring 217 and the indicating device 210, which consists, for instance, of a yellow lamp, is connected with the electric source 208, which connection with the electric source 208 is brought about by means of the spring 216. Since the spring 215 is mechanically pretensioned, at this point also the indicating device 209 is still in operation. Upon further upward movement of the pin 205, the contact formed before between the springs 214 and 215 is lifted and only the indicating device 210 is in operation. If the pin, upon further swinging of the mass is still further urged upwardly, due to the further upward movement of the end of the spring 214, the spring 217 comes into engagement with the spring 218 and thus the indicating devices 210 and 211, which consist, for instance, of a red lamp and a buzzer, are connected with the electric source 208. The contact formed thereby between the springs 216 and 217 caused by the mechanical pretension, at first does not open yet. For a certain range, thus the indicating device 210, as well as the indicating device 211 are in operation. Upon further upward movement of the pin 205, the contact formed previously between the springs 216 and 217 is now opened, and only the indicating device 211 is in operation, and connected with the electric source 208.

In order to make possible an adjustment of the measuring range, in which the response of the indicating devices should take place, the spring set is mounted movably parallel to the pin 205 in the guide 219. For a fine adjustment of predetermined positions of the spring set, a threaded spindle 220 is provided, which is axially displaceable in an immovable nut 221.

While I have disclosed several embodiments of the present invention, it is to be understood that these embodiments are given by example only and not in a limiting sense, the scope of the present invention being determined by the objects and the claims.

I claim:

1. An apparatus for the determination of the amount of the horizontal acceleration composed of at least one component in automotive vehicles, comprising a housing secured to a vehicle,
a pendulum mounted swingably in said housing and including a mass substantially horizontally movably disposed in said housing in at least two degrees of freedom,
a disc associated with said pendulum,
an electric contact device having a plurality of contacts,
an indicating device connected with each of said plurality of contacts,
a linkage means abutting against a surface of said disc and being moved by the swinging of said pendulum by acceleration and for operating said electric contact device upon movement of said pendulum mass, wherein each of said plurality of contacts are a successively operated with additional swinging of said pendulum, and
two of said indicating devices are operated simultaneously in a transfer range of operation of one of said indicating devices to the next adjacent range of operation of another of said indicating devices.

2. The apparatus, as set forth in claim 1, wherein said contact device comprises a contact spring set including a first contact spring operatively connected with said mass, a second contact spring forming with said first contact spring jointly a pretensioned contact, closed in the resting position of said mass,
a third contact spring and a fourth contact spring jointly providing a pretensioned contact closed in the resting position of said mass,
a fifth contact spring jointly with said fourth contact spring providing an open contact in the resting position of said mass,
said first contact spring jointly with said fourth contact spring providing an open contact in the resting position of said mass, such that upon operation of said first contact spring the latter engages first said fourth contact spring, thereafter said first and second contact springs disengage, whereupon, then said fourth contact spring still in engagement with said first and third contact springs engages said fifth contact spring, and finally said third contact springs disengage with said fourth contact spring, whereupon said first and fifth contact springs are in engagement by said fourth contact spring.

3. The apparatus, as set forth in claim 1, which includes
means for adjusting said contact device as a total unit, in order to set the response values of the individual indicating device.

4. The apparatus, as set forth in claim 3, wherein said adjusting means comprises a threaded spindle.

References Cited

UNITED STATES PATENTS

| | | | |
|---|---|---|---|
| 1,317,072 | 9/1919 | Carlier. | |
| 1,411,298 | 4/1922 | Osborn | 200—61.45 |
| 2,075,040 | 3/1937 | Kieber | 200—61.51 |
| 2,386,777 | 10/1945 | Bentley | 340—262 |
| 2,401,213 | 5/1946 | Wood | 200—166.1 |
| 2,433,585 | 12/1947 | Warner. | |
| 2,440,342 | 4/1948 | Mayne. | |
| 2,474,610 | 6/1949 | Wunsch | 340—262 |
| 2,490,785 | 12/1949 | De Vany. | |
| 2,552,722 | 5/1951 | King | 73—516 |
| 2,547,199 | 4/1951 | Dezzani | 340—262 |
| 2,596,427 | 5/1952 | Nordmark et al. | 200—61.51 |
| 2,665,896 | 1/1954 | Kirby et al. | 340—262 X |
| 2,692,652 | 10/1954 | Wilson | 200—61.47 X |
| 2,872,495 | 2/1959 | Burgess | 200—61.49 X |
| 2,972,134 | 2/1961 | McKay | 340—262 X |
| 3,023,626 | 3/1962 | Bonnell | 73—517 |
| 3,073,922 | 1/1963 | Miller | 340—65 X |
| 3,077,783 | 2/1963 | Stiles et al. | 73—517 |
| 3,081,637 | 3/1963 | Gevas | 73—517 |

FOREIGN PATENTS 712,369 10/1931 France.

JOHN W. CALDWELL, *Primary Examiner.*

NEIL C. READ, *Examiner.*

D. L. TRAFTON, *Assistant Examiner.*